United States Patent
Zhu et al.

(10) Patent No.: US 11,330,442 B2
(45) Date of Patent: May 10, 2022

(54) SIGNAL TRANSMISSION METHOD AND APPARATUS

(71) Applicant: Huawei Technologies Co., Ltd., Shenzhen (CN)

(72) Inventors: Jun Zhu, Shenzhen (CN); Jiyong Pang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/679,877

(22) Filed: Nov. 11, 2019

(65) Prior Publication Data

US 2020/0077276 A1 Mar. 5, 2020

Related U.S. Application Data

(63) Continuation of application No. PCT/CN2018/086322, filed on May 10, 2018.

(30) Foreign Application Priority Data

May 12, 2017 (CN) .......................... 201710333099.0

(51) Int. Cl.
*H04W 16/14* (2009.01)
*H04L 5/00* (2006.01)
(Continued)

(52) U.S. Cl.
CPC .......... *H04W 16/14* (2013.01); *H04L 5/0007* (2013.01); *H04L 5/0082* (2013.01);
(Continued)

(58) Field of Classification Search
CPC .. H04W 16/14; H04W 72/0446; H04W 72/04
See application file for complete search history.

(56) References Cited

U.S. PATENT DOCUMENTS

2015/0223075 A1* 8/2015 Bashar ............... H04W 16/14
370/329
2016/0066322 A1* 3/2016 Bontu ............... H04W 16/14
370/329
(Continued)

FOREIGN PATENT DOCUMENTS

CN 105227282 A 1/2016
CN 105246159 A 1/2016
(Continued)

OTHER PUBLICATIONS

"Frame structure design for LAA considering LBT," Source: ZTE, Agenda Item: 2.2, Document for: Discussion and Decision, 3GPP TSG RAN WG1 Ad-hoc Meeting, R1-151024, Paris, France, Mar. 24-26, 2015, 7 pages.

(Continued)

*Primary Examiner* — Raj Jain
(74) *Attorney, Agent, or Firm* — Slater Matsil, LLP

(57) ABSTRACT

A signal transmission method and apparatus, the method including obtaining, by a network device, an end moment of first downlink transmission, where the first downlink transmission occupies at least one of one or more downlink subframes, a downlink transmission part of a self-contained subframe, or a combination of one or more downlink subframes and a downlink transmission part of a self-contained subframe, and performing, by the network device, second downlink transmission in an unlicensed frequency band after a first guard period from the end moment of the first downlink transmission, where at least one terminal device senses a channel in the first guard period, and the second downlink transmission is used to reserve the channel for the at least one terminal device.

18 Claims, 10 Drawing Sheets

(51) Int. Cl.
  *H04L 27/26* (2006.01)
  *H04W 56/00* (2009.01)
  *H04W 72/04* (2009.01)

(52) U.S. Cl.
  CPC ..... *H04L 27/2607* (2013.01); *H04W 56/0045* (2013.01); *H04W 72/0446* (2013.01)

(56) References Cited

U.S. PATENT DOCUMENTS

| | | | | |
|---|---|---|---|---|
| 2016/0262023 | A1* | 9/2016 | Hiertz | ................ H04W 74/006 |
| 2017/0099666 | A1 | 4/2017 | Nama | |
| 2017/0325225 | A1* | 11/2017 | Dinan | .................. H04W 16/14 |
| 2017/0325258 | A1* | 11/2017 | Nogami | ............... H04L 5/0087 |
| 2018/0317256 | A1* | 11/2018 | Um | .................. H04W 74/0808 |
| 2020/0077276 | A1* | 3/2020 | Zhu | .................. H04W 72/0446 |

FOREIGN PATENT DOCUMENTS

| | | |
|---|---|---|
| CN | 105323854 A | 2/2016 |
| CN | 105634700 A | 6/2016 |
| CN | 105721376 A | 6/2016 |
| CN | 105850205 A | 8/2016 |
| CN | 105900513 A | 8/2016 |
| CN | 106658718 A | 5/2017 |
| WO | 2017020239 A1 | 2/2017 |

OTHER PUBLICATIONS

"Clear Channel Assessment for UL Transmissions," Source: Panasonic, Agenda Item: 7.3 1.5, Document for Discussion, 3GPP TSG-RAN WG1 Meeting 84, R1-160793, Feb. 15-19, 2016, 2 pages.

"Numerology and Frame Structure for NR-Unlicensed," Agenda Item: 7.1.4, Source: Huawei, HiSilicon, Document for: Discussion/Decision, 3GPP TSG RAN WG1 Meeting #85, R1-164723, Nanjing, China, May 23-27, 2016, 5 pages.

"Indication of DL Transmission Burst for LAA," Agenda Item: 7.2.3.3, Source: Huawei, HiSilicon, Document for: Discussion/Decision, 3GPP TSG RAN WG1 Meeting #82bis, R1-155657, Malmo, Sweden, Oct. 5-9, 2015, 3 pages.

"Forward Compatibility Considerations on NR Operations of the Unlicensed Band," Agenda Item: 7.1.7, Source Huawei, HiSilicon, Document for: Discussion and Decision, 3GPP TSG RAN WG1 Meeting #87, R1-1611248, Reno, Nevada, Nov. 14-18, 2016, 4 pages.

* cited by examiner

SIGNAL TRANSMISSION METHOD AND APPARATUS

CROSS-REFERENCE TO RELATED APPLICATIONS

This application is a continuation of International Application No. PCT/CN2018/086322, filed on May 10, 2018, which claims priority to Chinese Patent Application No. 201710333099.0, filed on May 12, 2017. The disclosures of the aforementioned applications are hereby incorporated by reference in their entireties.

TECHNICAL FIELD

This application relates to the communications field, and in particular, to a signal transmission method and apparatus, and is intended to transmit a signal on an unlicensed spectrum.

BACKGROUND

As a mobile internet enters a new growth stage, more mobile terminals are connected to each other and share richer data, and operators face a challenge of a thousand-fold increase in mobile data traffic. Therefore, a capacity of a mobile communications system needs to be improved by using a set of combination methods from different perspectives, such as using more spectrums, more effectively utilizing existing spectrums, and deploying more small cells. From the earliest analog cellular communication to the latest long term evolution (LTE) technology, spectral efficiency has been improved greatly. In addition, the 3rd generation partnership project (3GPP) further studies and proposes a heterogeneous network (HetNet) architecture, to improve a system capacity by deploying a large quantity of home eNodeBs (HeNB) within a coverage area of a macro cell, to meet a rapidly growing traffic requirement. However, the challenge of the thousand-fold increase in the traffic is difficult to cope with only by improving spectral efficiency and deploying more small cells. In recent years, to promote wireless broadband development, a large quantity of unlicensed spectrum resources are opened up worldwide. If a cellular network technology with higher reliability and performance can be used to effectively utilize the large quantity of idle and free unlicensed frequency resources, pressure on the frequency resources can be greatly alleviated.

For the operators, if an operating frequency band in the LTE technology is extended to a free unlicensed frequency band with rich resources, it is expected that frequency resource obtaining costs are greatly reduced, a network load is effectively offloaded, and pressure on network capacity expansion is reduced. A licensed-assisted access (LAA) technology is an implementation solution in which an unlicensed spectrum is introduced into the LTE technology. In a version of 3GPP, research on the LAA is started and standard formulation has been completed. In the LAA, all LTE control and data channels in a licensed frequency band continue to be run. In addition, channel bonding between a primary cell and a secondary cell is implemented through carrier aggregation (CA), as shown in the figure. A primary cell and a secondary cell are included. The primary cell operates in a licensed frequency band to transfer a key message and a service that requires assured quality of service. The secondary cell operates in an unlicensed frequency band, to improve actual data plane performance, and the secondary cell supports only downlink data transmission. In addition, in another version of 3GPP, research work on enhanced licensed-assisted access (eLAA) is started, so that a secondary cell can support both uplink and downlink transmission.

Currently, 3GPP has started research work on the 5th generation radio access technology standardization (5G). 5G is a generic name of solutions of a plurality of integrated new radio access technologies and existing radio access technologies. 5G will fully surpass LTE in terms of resource utilization, a system throughput rate, and a spectrum resource by introducing a new radio transmission technology and a new system structure and further mining new spectrum resources. Further, how to implement transmission on an unlicensed spectrum in 5G is still an open problem currently.

SUMMARY

This application provides a signal transmission method and apparatus. Specifically, technical solutions disclosed in this application are as follows.

According to a first aspect, this application provides a signal transmission method. The method is applied to a transmission structure including downlink symbols, idle symbols, and uplink symbols, such as a self-contained subframe, a self-contained mini-slot, or a self-contained partial subframe. The method includes obtaining, by a network device, an end moment of first downlink transmission, where the first downlink transmission occupies one or more downlink subframes, a downlink transmission part of a self-contained subframe, or a combination of one or more downlink subframes and a downlink transmission part of a self-contained subframe, and performing, by the network device, second downlink transmission in an unlicensed frequency band after a first guard period from the end moment of the first downlink transmission, where at least one terminal device senses a channel in the first guard period, the second downlink transmission includes sending a second downlink signal by the network device, and the second downlink signal is used to reserve the channel for the at least one terminal device.

According to the method provided in this aspect, a base station configures a second downlink signal in a guard period used for uplink and downlink switching, and sends the second downlink signal or performs second downlink transmission after the first guard period from the end moment of the first downlink transmission, to reserve a channel for UE. Therefore, the UE does not need to send any signal, thereby saving transmit power of the UE.

In a possible design, when channel sensing duration allocated by the network device to the terminal devices is different, duration of the first guard period may also be different. Therefore, the network device configures corresponding duration based on sensing capabilities of the terminal devices, so that the terminal devices complete channel status sensing. In the foregoing method steps, before the step of performing, by the network device, second downlink transmission, the method further includes setting, by the network device, duration of the first guard period. Further, the network device may determine the duration of the first guard period based on the channel sensing duration allocated to each terminal device.

In another possible design, before the step of performing, by the network device, second downlink transmission, the method further includes setting duration of the second downlink transmission, that is, duration for sending the second downlink signal. Further, the network device first sets a second guard period. Specifically, the network device may determine the second guard period based on at least one of a timing advance (TA for short) of each terminal device and an uplink and downlink switching capability of each terminal device, and then, determine the duration of the second downlink transmission based on the first guard period and the second guard period. If the network device sets the duration of the second downlink transmission, the network device continuously sends the second downlink signal within the duration, and the network device configures the second guard period, so that the terminal device has a sufficient time to complete uplink and downlink switching in the second guard period, to prepare for uplink transmission.

In still another possible design, the duration of the second downlink transmission is a time interval between an end moment of the first guard period and a start moment of the second guard period.

In still another possible design, the duration of the second downlink transmission is a time interval between an end moment of the first guard period and a start moment of an integer quantity of orthogonal frequency division multiplexing (OFDM) symbols of an uplink subframe specified by the network device. That is, the duration of the second downlink transmission starts from the end moment of the first guard period to an end of idle OFDM symbol duration.

In still another possible design, the duration of the second downlink transmission includes, in time domain, a slot including at least one OFDM symbol. Further, if the time interval between the end moment of the first downlink transmission and the start moment of the integer quantity of OFDM symbols of the uplink subframe specified by the network device is duration of an idle OFDM symbol, and the duration of the idle OFDM symbol corresponds to a first subcarrier, the step of performing, by the network device, second downlink transmission specifically includes setting, by the network device, a second subcarrier, where the second subcarrier is N times the first subcarrier, N is an integer greater than or equal to 2, the second subcarrier corresponds to duration of a second OFDM symbol, and the duration of the second downlink transmission includes at least one second OFDM symbol, and when performing the second downlink transmission, performing, by the network device, the second downlink transmission by using the at least one second OFDM symbol, where each second OFDM symbol may carry useful information, for example, carry any one or a combination of control signaling, a reference signal, or a synchronization signal, to avoid occupying another resource to send or carry useful information, thereby reducing resource overheads.

In still another possible design, the step of performing, by the network device, second downlink transmission includes sensing, by the network device, a channel in the first guard period, to detect whether the channel is idle, and if the channel is idle, performing, by the network device, the second downlink transmission in the unlicensed frequency band after the first guard period from the end moment of the first downlink transmission, or if the channel is busy, skipping performing the second downlink transmission. In this design, the network device senses the channel in the first guard period. If the channel is busy, it indicates that interference to the network device may be relatively strong. In this case, if a terminal device performs uplink transmission, a probability that the network device correctly receives uplink data is reduced due to the interference. In this case, the network device does not send the second downlink signal to help the terminal device reserve a channel. Therefore, the terminal device is prevented from performing corresponding uplink transmission, thereby reducing power consumption of the terminal device.

According to a second aspect, this application further provides a signal transmission method. The method is applied to a terminal device. Specifically, the method includes sensing, by the terminal device, a channel in a first guard period, and if the sensed channel is idle, performing, by the terminal device, first uplink transmission after a first time interval and when a start moment of an integer quantity of OFDM symbols of an uplink subframe specified by a network device arrives, where the first time interval is a time interval between an end moment of the channel sensing and the start moment of the integer quantity of OFDM symbols of the uplink subframe specified by the network device, and the first guard period may be determined based on channel sensing duration allocated by the network device to each terminal device.

According to the method provided in this aspect, the terminal device does not need to send an uplink signal to preempt a channel, but the network device performs second downlink transmission after the first guard period from an end moment of a first downlink transmission. Therefore, the terminal device does not need to send some OFDM symbols that cannot carry useful information, thereby reducing power consumption of the terminal. In addition, excessive protection caused by sending the some OFDM symbols by the terminal device is further avoided. This method reduces a possibility of excessive protection and improves an overall throughput rate of a system.

In a possible design, the step of performing, by the terminal device, first uplink transmission includes detecting, by the terminal device, whether the network device performs the second downlink transmission, that is, whether the terminal device receives a second downlink signal after sensing the channel and before sending uplink data, and if the network device performs second downlink transmission, sending, by the terminal device, the uplink data to the network device when the start moment of the integer quantity of OFDM symbols of the uplink subframe specified by the network device arrives. In this design, the terminal device detects whether the second downlink transmission is performed, to determine interference to the network device. If the second downlink signal is not received, it indicates that the interference to the network device is relatively strong. If the terminal continues sending uplink data under this condition, a success rate of correct reception performed by the network device may be reduced. Therefore, the terminal device does not perform the first uplink transmission when the second downlink signal is not received, thereby saving transmit power of the terminal device.

According to a third aspect, this application further provides a network device. The network device includes modules or units configured to perform the method steps in the various implementations of the first aspect. Further, the network device includes an obtaining unit and a transmission unit, and may further include a processing unit, a storage unit, and the like. Specifically, the network device may be a base station, an enhanced base station, a relay having a scheduling function, a device having a base station function, or the like.

According to a fourth aspect, this application further provides a terminal device. The terminal device includes modules or units configured to perform the method steps in the various implementations of the second aspect. Further, the terminal device includes a transmission unit, a processing unit, and the like. Specifically, the terminal device may be user equipment (UE for short), a mobile terminal, or the like.

According to a fifth aspect, this application further provides a self-contained subframe. The self-contained subframe includes a first downlink transmission part, a guard period part, and a first uplink transmission part, where the guard period part is located between the first downlink transmission part and the first uplink transmission part and is used by a network device to perform uplink and downlink switching. Further, in the guard period part, duration used for second downlink transmission or duration of the second downlink transmission is set after a first guard period from an end moment of the first downlink transmission part. The network device sends a second downlink signal to at least one terminal device within the duration of the second downlink transmission, to reserve a channel for the at least one terminal device.

The self-contained subframe may be alternatively applied to another transmission structure that includes downlink symbols, idle symbols, and uplink symbols, such as a self-contained mini-slot or a self-contained partial subframe. This is not limited in this application.

In a possible design, the duration of the second downlink transmission is a time interval between an end moment of the first guard period and a start moment of a second guard period, where the second guard period may be determined based on at least one of a TA of each terminal device and an uplink and downlink switching capability of each terminal device.

In another possible design, the duration of the second downlink transmission is a time interval between an end moment of the first guard period and a start moment of an integer quantity of OFDM symbols of an uplink subframe specified by the network device.

According to a sixth aspect, this application further provides a base station. The base station includes functional components such as a transceiver, a processor, and a memory. The processor may execute a program or an instruction stored in the memory, to implement the signal transmission method in the various implementations of the first aspect.

According to a seventh aspect, this application further provides user equipment. The user equipment includes functional components such as a transceiver, a processor, and a memory. The processor may execute a program or an instruction stored in the memory, to implement the signal transmission method in the various implementations of the second aspect.

According to an eighth aspect, this application further provides a computer storage medium. The computer storage medium may store a program, where when the program is executed, some or all of the steps included in the embodiments of the signal transmission method provided in this application may be performed.

According to a ninth aspect, this application further provides a computer program product including an instruction. When the computer program product is run on a computer, the computer is enabled to perform the method steps in the foregoing aspects.

According to the signal transmission method and apparatus provided in this application, the network device configures the second downlink signal in the guard period used for uplink and downlink switching, and performs the second downlink transmission after the first guard period from the end moment of the first downlink transmission, to reserve the channel for the UE. Therefore, the UE does not need to send any signal, thereby saving transmit power of the UE.

BRIEF DESCRIPTION OF THE DRAWINGS

To describe the technical solutions in the embodiments of this application more clearly, the following briefly describes the accompanying drawings required for describing the embodiments. Apparently, a person of ordinary skill in the art may still derive other drawings from these accompanying drawings without creative efforts.

DETAILED DESCRIPTION OF ILLUSTRATIVE EMBODIMENTS

To make a person in the art understand the technical solutions in the embodiments of the present disclosure better, and make the objectives, features, and advantages of the embodiments of this application clearer and more comprehensible, the following further describes the technical solutions in the embodiments of this application in detail with reference to the accompanying drawings.

Figure 1:
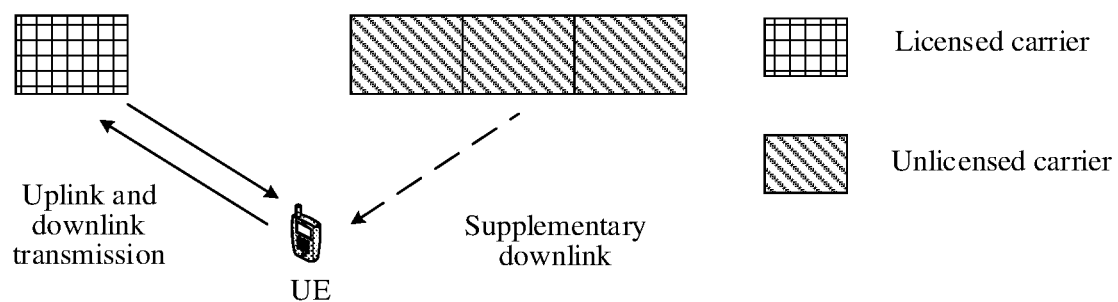
FIG. 1 is a schematic diagram of an LAA technology according to this application.
Figure 2:
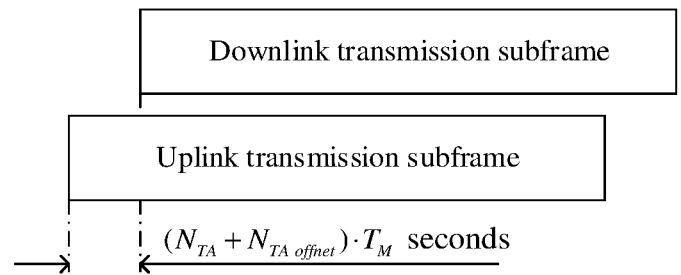
FIG. 2 is a schematic diagram of an uplink timing advance according to this application.

Currently, in an LTE system, an important feature of uplink transmission is that different user equipments (UEs) perform orthogonal multiple access in time and frequency, that is, uplink transmission of different UEs from a same cell does not interfere with each other. To ensure time synchronization on a receiving side (for example, a base station (eNodeB)), an uplink timing advance mechanism is proposed in an LTE technology. From the perspective of the UE, a timing advance (TA) is essentially a negative offset between an time of receiving a downlink subframe and a start time of transmitting an uplink subframe. The eNodeB may control, by properly controlling an offset of each UE, time points at which uplink signals from different UEs arrive at the eNodeB. For UE that is farther away from the eNodeB, due to a larger transmission delay, the UE needs to send uplink data earlier than UE that is closer to the eNodeB. As shown in FIG. 2, there is an offset between timing of an uplink transmission subframe and timing of a downlink transmission subframe of UE, and different UEs have different TAs.

In design of a 5G system, a self-contained subframe is proposed. The self-contained subframe includes an uplink transmission part and a downlink transmission part. The uplink transmission part and the downlink transmission part are located in the same subframe, the uplink transmission part is located after the downlink transmission part, and an uplink and downlink switching part is further included between the uplink transmission part and the downlink transmission part. In an application scenario of an unlicensed frequency band, when the self-contained subframe is used, and it is required that the UE senses a channel in 25 µs before transmission starts, if detecting that the channel is idle within the duration of 25 µs, the UE may start to send a physical uplink shared channel (PUSCH) at a moment that is after 25 µs starting from the $0^{th}$ symbol of an uplink subframe corresponding to the PUSCH plus a TA.

Figure 3:
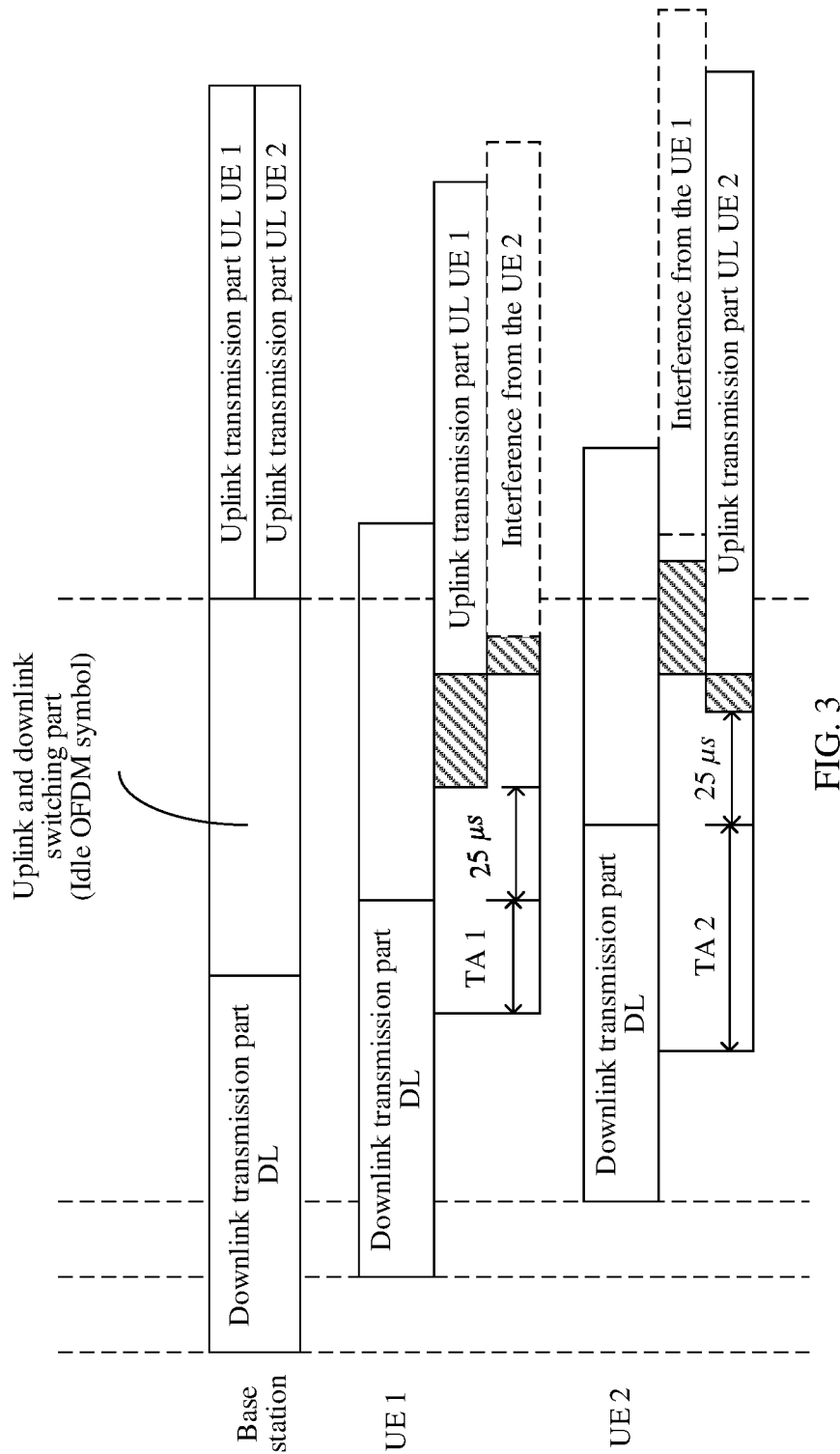
FIG. 3 is a schematic diagram of timing of an uplink transmission part of a self-contained subframe according to an embodiment of this application.

As shown in FIG. 3, a blank block represents an uplink and downlink switching part of a self-contained subframe, and is used to set a guard period. For example, the blank block represents one idle OFDM symbol. Assuming that the idle OFDM symbol is used as the $0^{th}$ OFDM symbol of an uplink transmission part, UE 1 needs to start to send an uplink signal at a moment that is after 25 µs starting from the $0^{th}$ OFDM symbol on a UE 1 side plus a TA 1. Similarly, UE 2 needs to start to send an uplink signal at a moment that is after 25 µs starting from the $0^{th}$ OFDM symbol on a UE 2 side plus a TA 2. The duration of 25 µs may be used for sensing a channel.

A shaded part in FIG. 3 represents an uplink signal that starts to be sent by the UE 1 or the UE 2 in the middle of the $0^{th}$ OFDM symbol, and the uplink signal is used to preempt a channel. The uplink signal does not occupy an integer quantity of OFDM symbols, and currently, the uplink signal is used as a cyclic prefix (CP) of a next symbol in eLAA. Therefore, the uplink signal sent by the UE cannot carry useful information. Consequently, transmit power of the UE is wasted.

The following embodiments of this application provide a signal transmission method and apparatus, to save transmit power of UE.

Figure 4:
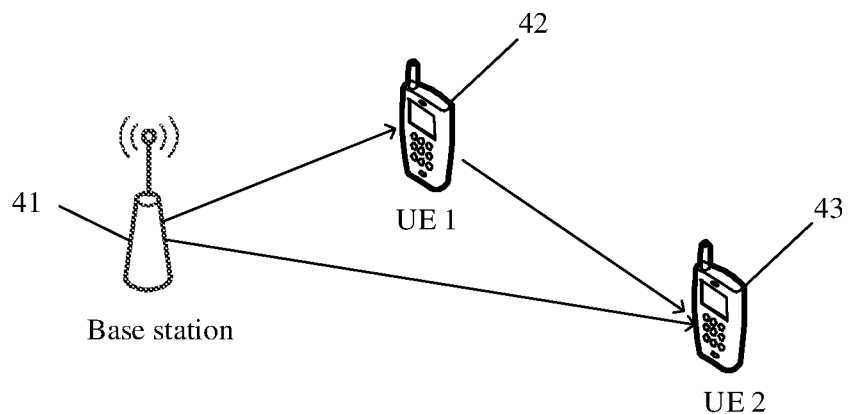
FIG. 4 is a schematic diagram of an application scenario according to an embodiment of this application.

Before the technical solutions in the embodiments of this application are described, an application scenario of the embodiments of this application is first described with reference to the accompanying drawings. FIG. 4 is a schematic diagram of an application scenario according to an embodiment of this application. The application scenario includes a base station 41, a UE1, and a UE2, and a location relationship between the base station and the UEs is shown in FIG. 4. In an example, in this implementation, a transmission subcarrier spacing is 15 kHz, and duration of one OFDM symbol is approximately 71.35 µs.

In addition, another terminal and another network device may be further included in this application scenario. Moreover, application scenarios in the embodiments of this application may be in a 5G system, may be applied to another wireless communications system, for example, a WLAN (Wireless Local Area Network) system, or may be applied to a more advanced next-generation wireless communications system. This is not limited in the embodiments of this application.

In the embodiments of this application, the terminal device may be a device that provides a user with voice and/or data connectivity, a handheld device with a wireless connection function, or another processing device connected to a wireless modem. The terminal device may communicate with one or more core networks through a radio access network (RAN). The terminal device may be a mobile terminal, such as a mobile phone (or referred to as a "cellular" phone) or a computer with a mobile terminal, for example, may be a portable, pocket-sized, handheld, computer built-in, or in-vehicle mobile apparatus, which exchanges voice and/or data with the radio access network. For example, the terminal device may be a device such as a personal communication service (PCS) phone, a cordless phone set, a session initiation protocol (SIP) phone, a wireless local loop (WLL) station, a personal digital assistant (PDA), or a station (STA). Alternatively, the terminal device may be a remote terminal (RT), an access terminal (AT), a user terminal (UT), a user agent (UA), or user equipment (UE).

The network device may be a base station, an enhanced base station, a relay having a scheduling function, a device having a base station function, or the like. The base station may be an evolved NodeB (eNB) in an LTE system, or may be a base station in another system. Alternatively, the network device may be an access point (AP), a wireless access point, or the like in a WLAN system. This is not limited in the embodiments of this application.

Interference, for example, interference from Bluetooth or a WLAN, exists in an unlicensed spectrum. Therefore, uplink UE first needs to perform LBT (Listen before Talk), that is, needs to sense whether a channel is idle, to determine whether another UE is transmitting data. If the channel is idle, the UE may transmit data to the base station. Otherwise, the UE tries again after waiting a time period. In eLAA, based on different transmission manners, as shown in Table 1, a start location of a PUSCH sent by the UE has the following four possibilities.

TABLE 1

| Value | Start location of a PUSCH |
|-------|---------------------------|
| 00 | Symbol 0 |
| 01 | 25 µs in symbol 0 |
| 10 | (25 + TA) µs in symbol 0 |
| 11 | Symbol 1 |

In Table 1, 00 represents that the UE does not need to sense a channel, and may directly send the PUSCH in the $0^{th}$ symbol of an uplink subframe. 01 represents that the UE first senses a channel for 25 µs before performing uplink transmission, and a subframe prior to an uplink subframe corresponding to the PUSCH sent by the UE is also an uplink subframe. If the channel is idle, the UE may start to send the PUSCH at a moment after 25 µs starting from the $0^{th}$ symbol of the uplink subframe corresponding to the PUSCH. 10 represents that the UE first needs to sense a channel for 25 µs before performing uplink transmission, and a subframe prior to an uplink subframe corresponding to the PUSCH sent by the UE is a downlink subframe. If the channel is idle, the UE may start to send the PUSCH at a moment after 25 µs starting from the $0^{th}$ symbol of the uplink subframe corresponding to the PUSCH plus a TA. 11 represents that the UE first performs random backoff before performing uplink transmission, and if the backoff ends, the UE may send the PUSCH from the $1^{st}$ symbol of an uplink subframe. For a random backoff process, refer to an LTE standard.

In the methods provided in the embodiments of this application, the network device, for example, a base station, sends a downlink signal in a place of UE in an uplink and downlink switching gap, to help the UE preempt a channel, thereby saving transmit power of the UE.

For ease of understanding, the following describes operation steps of the base station, the UE 1, and the UE 2 in the application scenario shown in FIG. 4 respectively by using specific embodiments.

Figure 5:
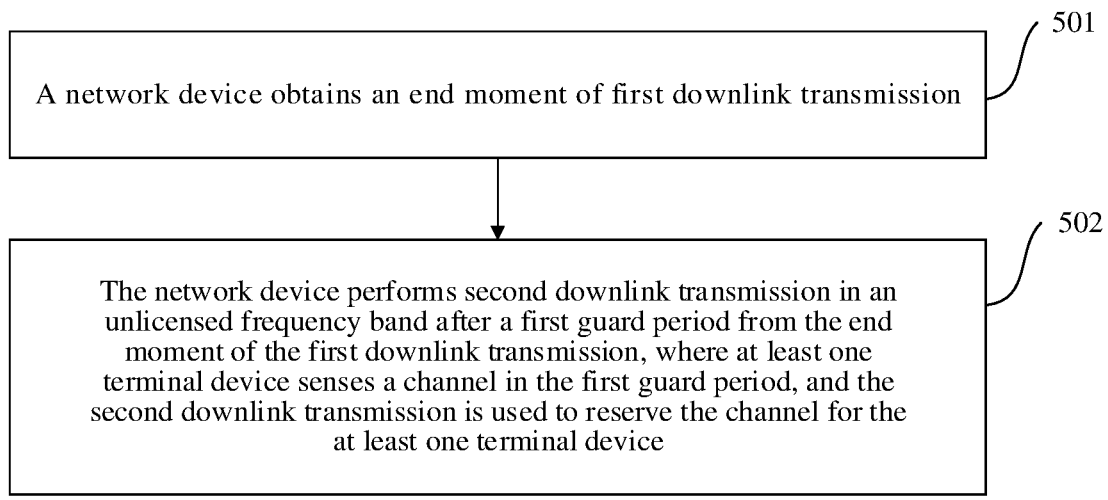
FIG. 5 is a schematic flowchart of a signal transmission method according to an embodiment of this application.

FIG. 5 is a schematic flowchart of a signal transmission method according to an embodiment of this application. This embodiment is performed by the base station 41. Specifically, this embodiment may include the following steps.

Step 501. The base station obtains an end moment of first downlink transmission, where the first downlink transmission occupies one or more downlink subframes, a downlink transmission part of a self-contained subframe, or a combination of one or more downlink subframes and a downlink transmission part of a self-contained subframe.

Step 502. The base station performs second downlink transmission in an unlicensed frequency band after a first guard period from the end moment of the first downlink transmission, where at least one UE senses a channel in the first guard period, and the second downlink transmission is used to reserve the channel for the at least one UE.

Specifically, the step of performing, by the base station, second downlink transmission in an unlicensed frequency band includes the base station obtains or generates a second downlink signal in advance, where the second downlink signal is used to reserve the channel for the at least one UE that operates in the unlicensed frequency band; and the base station sends the second downlink signal after the first guard period from the end moment of the first downlink transmission.

The one or more downlink subframes may be a self-contained mini-slot (mini-slot), a self-contained partial subframe, or the like. This is not limited in this embodiment of this application. In another implementation, the second downlink transmission may further include any one or a combination of a downlink subframe, a downlink slot, or a downlink mini-slot.

In an implementation, before step 502 of performing, by the base station, second downlink transmission, the method further includes a step of setting, by the base station, duration of the first guard period. Specifically, the base station determines the duration of the first guard period based on channel sensing duration allocated to each UE. For example, the base station specifies scheduled UE to sense a channel. If duration within which the UE senses the channel is x μs, the duration of the first guard period is x μs.

Figure 6:
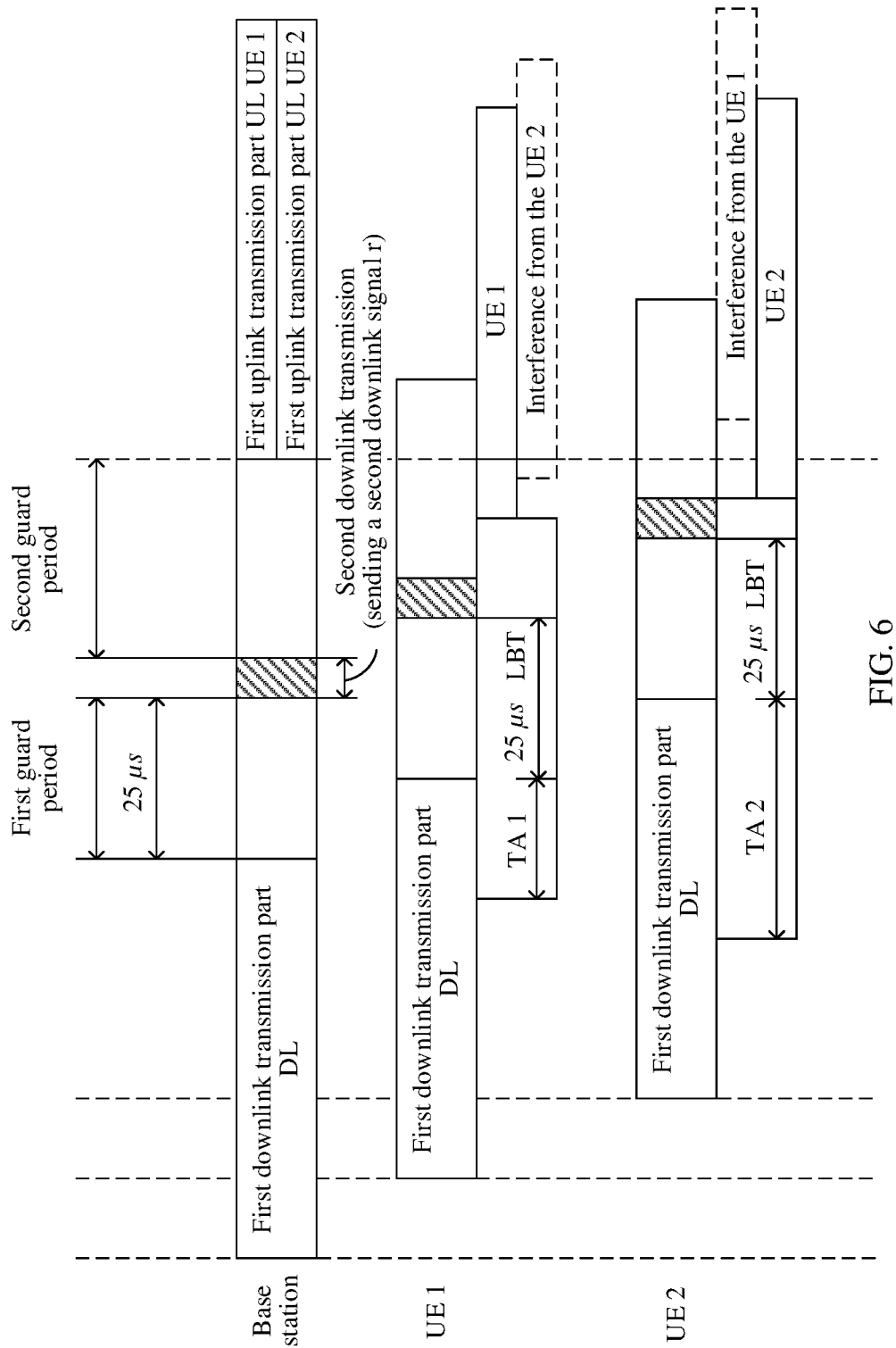
FIG. 6 is a schematic diagram of a type of downlink transmission of a base station according to an embodiment of this application.

FIG. 6 is a schematic diagram of the second downlink transmission performed by the base station according to an embodiment. Referring to FIG. 6, a first downlink transmission part, a second downlink transmission part, a first uplink transmission part, and a guard period are included. The guard period (that is, a blank block) between the first downlink transmission part and the first uplink transmission part is used by the base station to perform uplink and downlink switching. It is assumed that the guard period (that is, the blank block) indicates a guard period required for uplink and downlink switching performed by the base station. In this embodiment, the blank block is set as one idle OFDM symbol. The second downlink transmission part is set in the idle OFDM symbol. A shaded part in FIG. 6 indicates the second downlink transmission part, and the second downlink transmission part is used to send a second downlink signal r to at least one UE, to help the UE preempt a channel. It is assumed that the first uplink transmission part occupies the $1^{st}$ OFDM symbol for uplink transmission, and the first uplink transmission part includes uplink data sent from the UE 1 and the UE 2. The second downlink transmission part divides the idle OFDM symbol into two guard periods, which are respectively a first guard period and a second guard period.

In this embodiment, before performing second downlink transmission, the base station first needs to perform downlink transmission in the first downlink transmission part with the UE 1 and the UE 2, and after receiving the downlink transmission, the UE 1 needs to sense a channel in the first guard period. For example, the base station configures that the UE senses the channel for 25 μs. If learning, through sensing, that the channel is idle and available, the UE 1 needs to start to send an uplink signal from the $1^{st}$ OFDM symbol of the first uplink transmission part on the UE 1 side. Similarly, after learning, through sensing, that the channel is idle and available, the UE 2 needs to start to send an uplink signal from the $1^{st}$ OFDM symbol of the first uplink transmission part on the UE 2 side. In this embodiment, a TA 2 corresponding to the UE 2 is the largest TA for the currently scheduled UEs. Therefore, the sending of the second downlink signal r may end at a location of the TA 2 before the idle OFDM symbol of the base station.

In step 502, when the base station performs the second downlink transmission, the base station may send the second downlink signal r in any one of the following manners: broadcast, multicast, or unicast.

In another implementation of this embodiment, before the base station performs the second downlink transmission, the method further includes that the base station sets duration for sending the second downlink transmission (or for sending the second downlink signal r). Specifically, the base station may determine the duration of the second downlink transmission based on the first guard period and the second guard period. For example, the first guard period may be determined by using channel sensing duration allocated by the base station to the UE, and the second guard period may be determined by a TA of the UE. In this case, the duration of the second downlink transmission is a time interval between an end moment of the first guard period and a start moment of the second guard period. The second guard period is used by the base station to switch from downlink transmission to uplink transmission.

Figure 7:
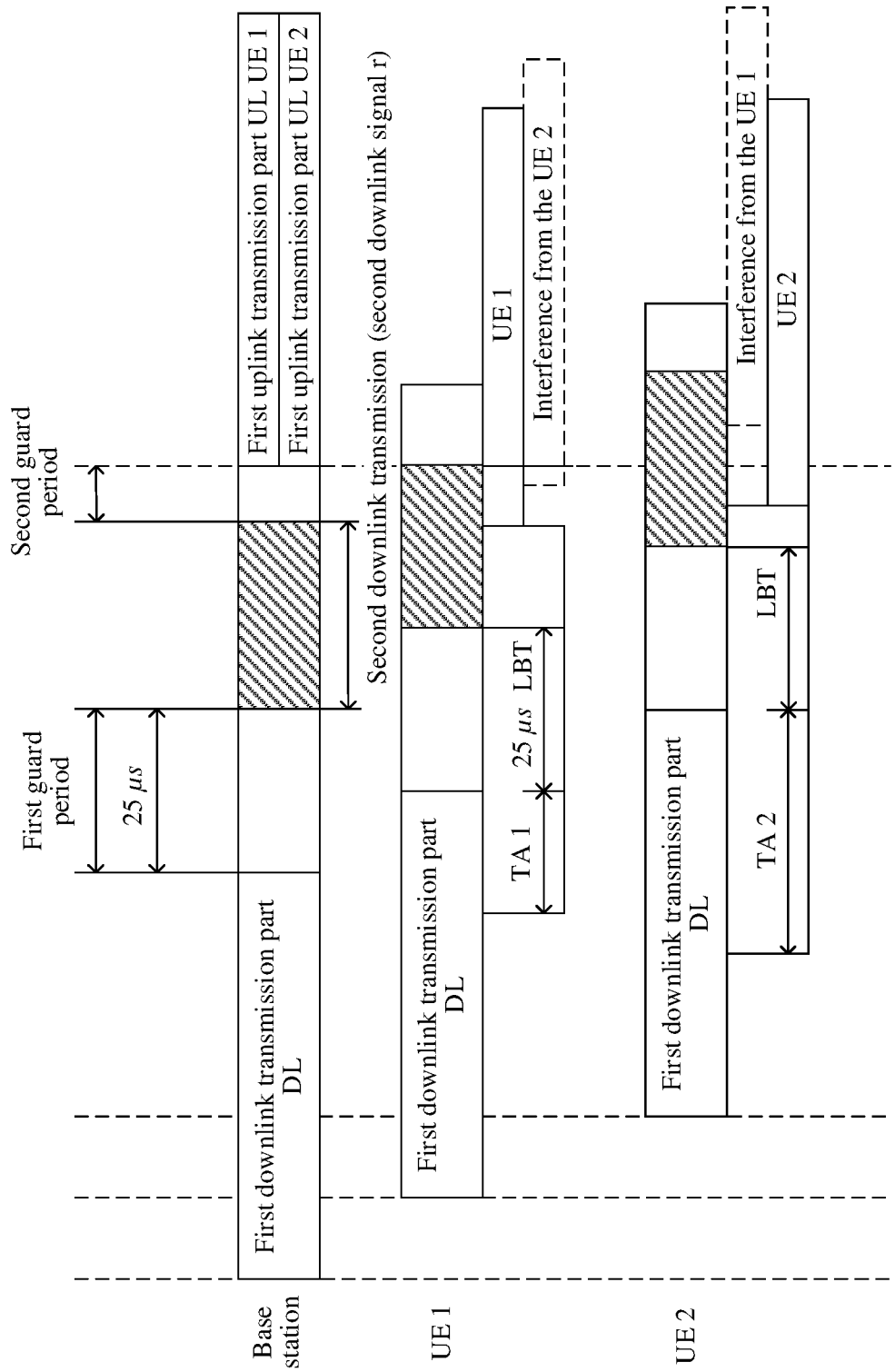
FIG. 7 is a schematic diagram of another type of downlink transmission of a base station according to an embodiment of this application.

In another implementation of this embodiment, the duration of the second downlink transmission may be alternatively determined based on a capability, of the base station, of switching from downlink transmission to uplink transmission. For example, the base station requires at least 5 μs to implement switching from downlink sending to uplink receiving, as shown in FIG. 7, a second downlink signal r may end at a location of 5 μs before an idle OFDM symbol on a base station side. In this case, although both the UE 1 and the UE 2 can receive the second downlink signal r sent by the base station, the UE 1 and the UE 2 need to ignore the second downlink signal r starting from the $1^{st}$ OFDM symbol in the first uplink transmission part, and start to send uplink data.

Figure 8:
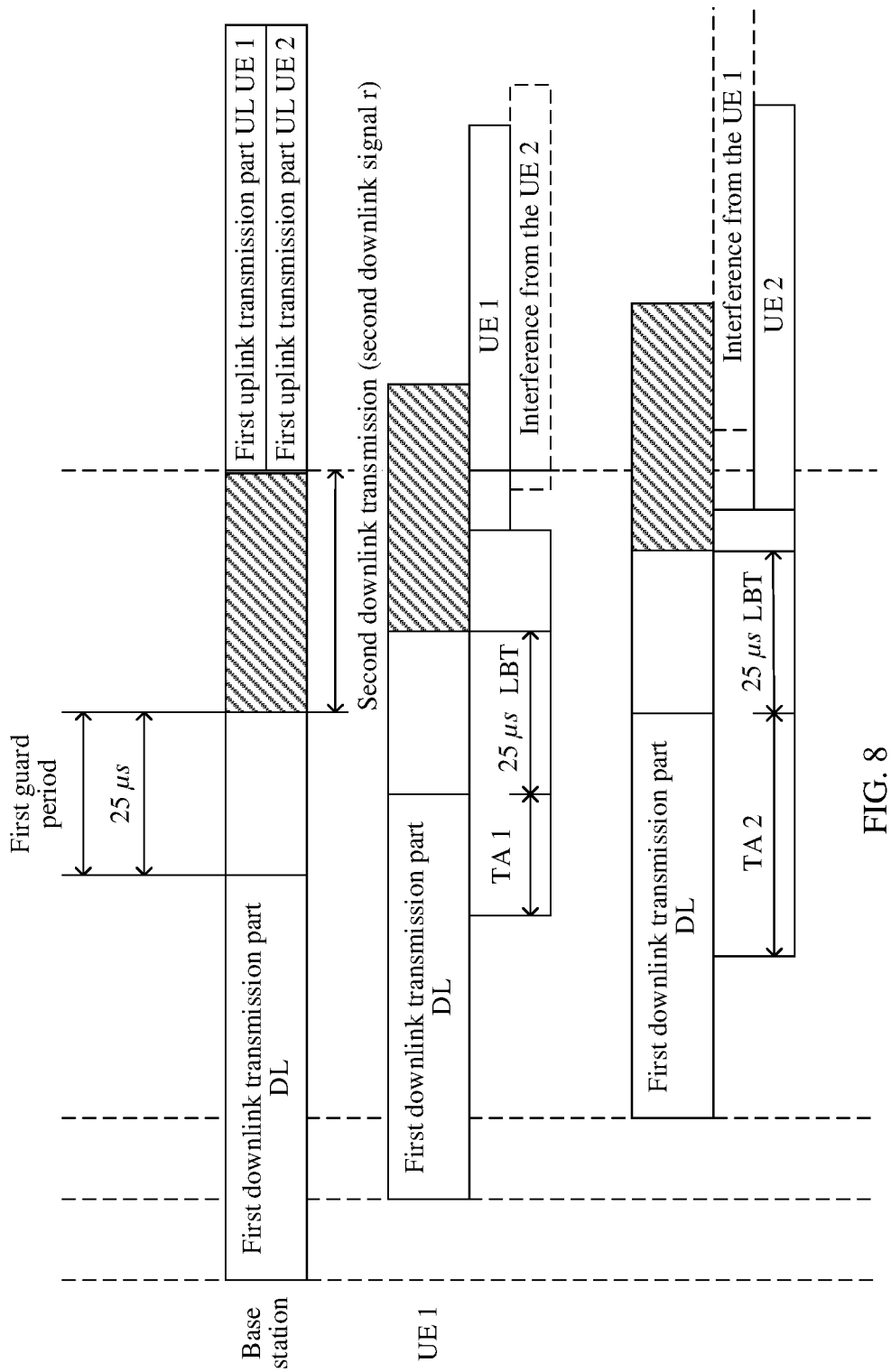
FIG. 8 is a schematic diagram of still another type of downlink transmission of a base station according to an embodiment of this application.

In still another implementation of this embodiment, the duration of the second downlink transmission is a time interval between an end moment of the first guard period and a start moment of an integer quantity of OFDM symbols of an uplink subframe specified by the base station. As shown in FIG. 8, the base station continuously sends a second downlink signal r until an idle OFDM symbol ends, where an end moment of the idle OFDM symbol is a start moment of the $1^{st}$ OFDM symbol of an uplink transmission part specified by the base station.

It should be noted that duration of the first guard period and duration of the second guard period in this embodiment are merely examples, and the duration of the second downlink transmission may be alternatively determined based on an LBT type and a capability of another base station and/or UE. This is not limited in this embodiment of this application.

In addition, the self-contained subframe in this embodiment of this application may alternatively be another similar transmission structure including downlink symbols, idle symbols, and uplink symbols, such as a self-contained mini-slot or a self-contained partial subframe. This is not limited in this embodiment of this application.

Further, in this embodiment, an uplink and downlink switching part between the first downlink transmission part and the first uplink transmission part may include one idle OFDM symbol, or may include two or more idle OFDM symbols, for example, two, three, or four OFDM symbols with a 15 kHz subcarrier spacing. In addition, the subcarrier spacing in this embodiment may alternatively be another value, for example, 60 kHz, 120 kHz, or 240 kHz. This is not limited in this embodiment either.

Figure 9:
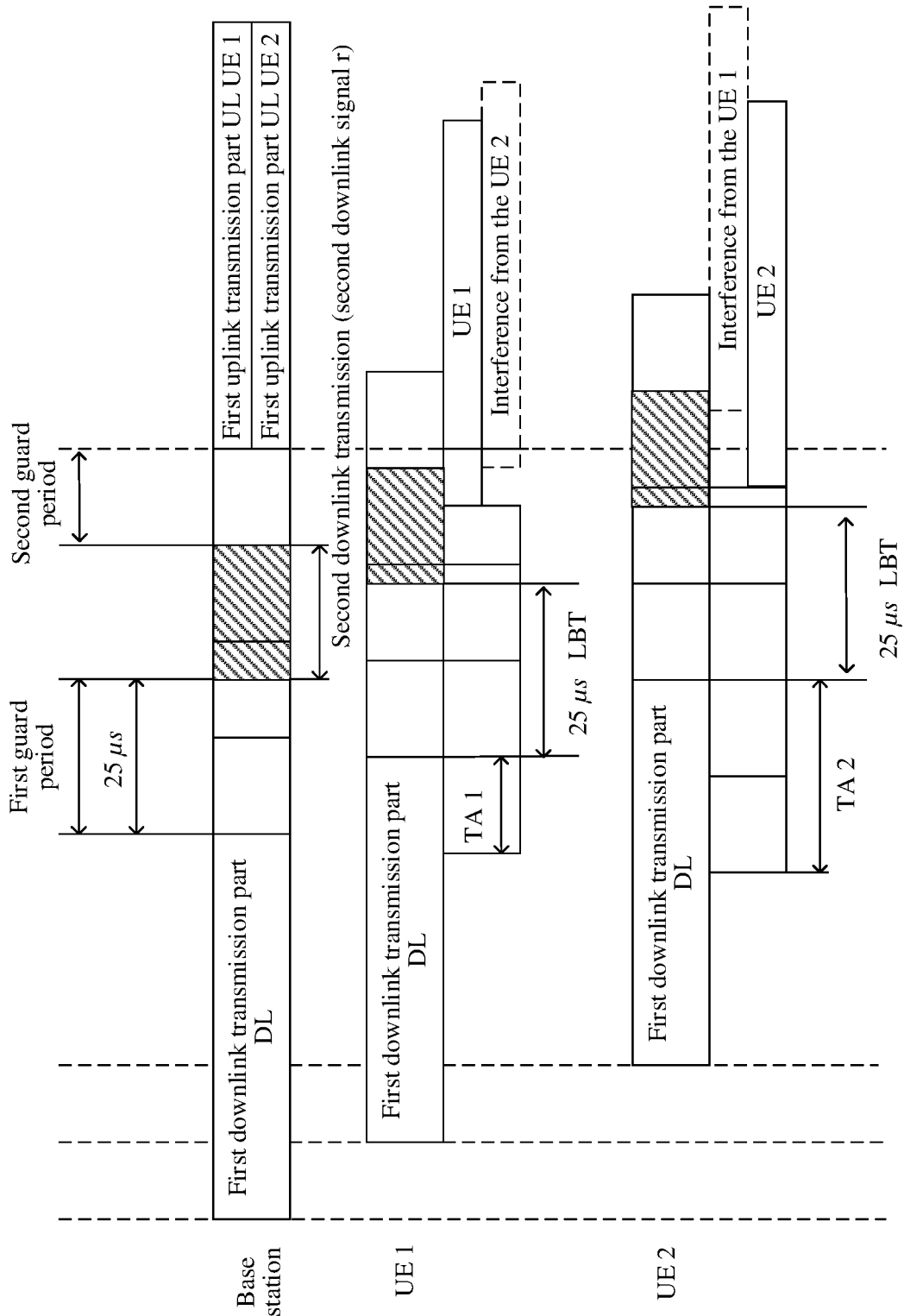
FIG. 9 is a schematic diagram of still another type of downlink transmission of a base station according to an embodiment of this application.

In a specific implementation of this application, the base station may alternatively configure, for the second downlink transmission, an OFDM symbol whose subcarrier spacing is smaller than that of an OFDM symbol in the downlink transmission part and/or the uplink transmission part. For example, as shown in FIG. 9, an idle OFDM symbol used for uplink and downlink switching corresponds to a first subcarrier of 15 kHz, and duration of the OFDM symbol is approximately 71.35 µs. The base station configures several second subcarriers, for example, a 60 kHz subcarrier spacing, and duration of each OFDM symbol corresponding to the second subcarrier of 60 kHz is ¼ of duration of the OFDM symbol corresponding to the subcarrier of 15 kHz, and is approximately 17.84 µs. A second downlink transmission part shown in FIG. 9 includes duration of a part of the second OFDM symbol corresponding to the 60 kHz subcarrier and duration of the third OFDM symbol corresponding to the 60 kHz subcarrier. In this case, the base station may send a second downlink signal r on a tail of the second OFDM symbol with the 60 kHz subcarrier spacing and the third OFDM symbol with the 60 kHz subcarrier spacing.

In addition, the base station may alternatively send the second downlink signal r on another OFDM symbol with the 60 kHz subcarrier spacing. For example, the base station sends the second downlink signal r on the fourth OFDM symbol with the 60 kHz subcarrier spacing, or performs the second downlink transmission on at least two OFDM symbols with the 60 kHz subcarrier spacing. In addition, alternatively, the second downlink signal r may be repeatedly sent on a plurality of OFDM symbols with the 60 kHz subcarrier spacing.

In another specific implementation, when the base station configures the duration of the second downlink transmission, the guard period used by the base station for uplink and downlink switching may further include more OFDM symbols, for example, eight OFDM symbols with the 60 kHz subcarrier spacing, or OFDM symbols with a larger subcarrier spacing such as 120 kHz or 240 kHz.

The duration of the second downlink transmission of the base station includes an integer quantity of OFDM symbols. Therefore, the integer quantity of OFDM symbols may be used to carry useful information. For example, in this embodiment, an OFDM symbol corresponding to the second subcarrier spacing may carry one or a combination of control signaling, a reference signal, and a synchronization signal. Therefore, the base station does not need to send useful information by using another resource, thereby effectively utilizing a second downlink resource. In addition, UEs in a same cell and/or adjacent cells may measure cell quality or perform synchronous cell tracing by using received second downlink signals r.

According to the signal transmission method provided in this embodiment, the base station configures the second downlink signal in the guard period for uplink and downlink switching, and sends the second downlink signal or performs the second downlink transmission after the first guard period from the end moment of the first downlink transmission, to reserve the channel for the UE. Therefore, the UE does not need to send any signal, thereby saving transmit power of the UE.

Further, in a process of performing the second downlink transmission, the base station may further sense a channel in the first guard period, to detect whether the channel is idle. If the channel is idle, for example, an interference power is less than a threshold, the base station sends the second downlink signal for the second downlink transmission. If the channel is busy, for example, the interference power is greater than the threshold, the base station neither sends the second downlink signal nor performs the second downlink transmission. The second downlink signal may be a predefined time domain signal, and a source of the second downlink signal is not limited in this embodiment of this application.

In this embodiment, the base station senses the channel in the first guard period, and determines, based on a sensing result, whether to perform the second downlink transmission. If the sensed channel is busy, it indicates that interference to the base station may be relatively strong. In this case, if the uplink data sent by the UE is received, a probability that the base station correctly receives the uplink data is reduced due to the interference. Therefore, when the channel is busy, the base station does not send the second downlink signal and therefore does not reserve the channel for the UE. Further, the UE does not perform corresponding uplink transmission, thereby reducing power consumption on a UE side.

Figure 10:
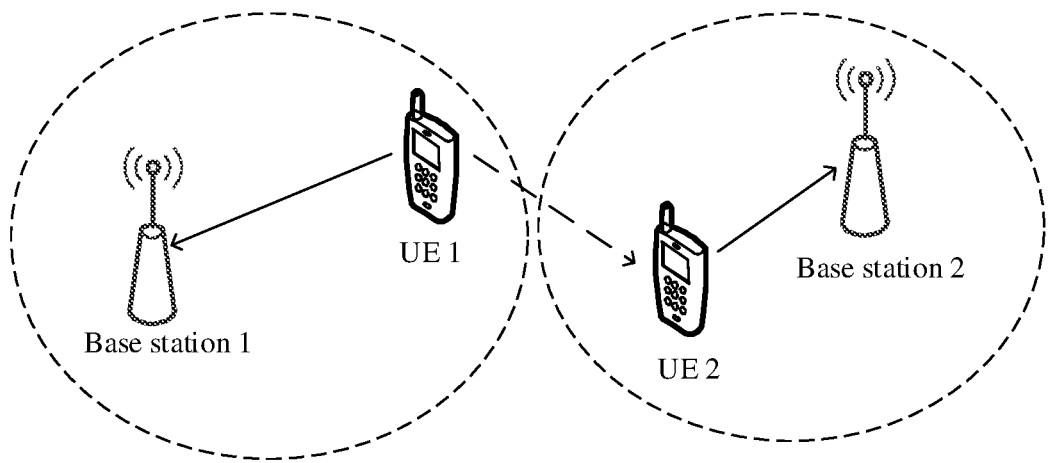
FIG. 10 is a schematic diagram of mutual uplink interference between adjacent cells according to this application.

In addition, in a technical scenario in which two or more UEs in adjacent cells send uplink data and interfere each other, as shown in FIG. 10, UE 1 is located in a cell covered by a base station 1, UE 2 is located in a cell covered by a base station 2, and the UE 2 is farther away from the base station 1 compared with the UE 1. If a current manner in which UE sends an uplink signal to reserve a channel is used, for example, the UE 1 and the UE 2 are separately scheduled to perform uplink transmission, in a possible implementation, the UE 1 and the UE 2 simultaneously send uplink data to the base station 1. However, an uplink signal (for example, some OFDM symbols) sent by the UE 1 may interfere with channel sensing and detection performed by the UE 2, causing a failure of channel detection performed by the UE 2. Consequently, the UE 2 cancels the current transmission, excessive protection is caused by sending a part of the uplink signal by the UE 1, and an overall throughput rate of a system is reduced.

According to the signal transmission method provided in this embodiment, the UE does not need to send an uplink signal to preempt a channel, and instead, the base station performs downlink transmission after the first guard period from the end moment of the first downlink transmission. Therefore, the UE does not need to send some OFDM symbols that cannot carry useful information, thereby reducing power consumption of the UE. In addition, excessive protection caused by sending the some OFDM symbols by the UE is further avoided. This method reduces a possibility of excessive protection and improves an overall throughput rate of a system.

Figure 11:
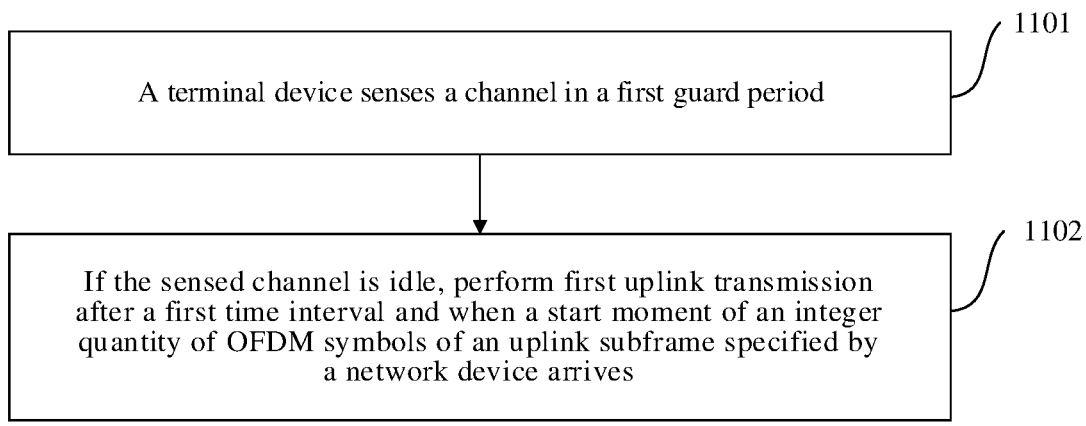
FIG. 11 is a schematic flowchart of another signal transmission method according to an embodiment of this application.

Corresponding to the foregoing embodiment of the method for performing second downlink transmission by the base station, on a UE side, this application further provides a signal transmission method. As shown in FIG. 11, using UE 1 as an example, the method includes the following steps.

Step 1101. The UE 1 senses a channel in a first guard period, and detects whether the channel is idle.

The first guard period may be determined based on channel sensing duration allocated by a base station to the UE 1, or may be determined based on an LBT type of the UE 1.

Step 1102. If the sensed channel is idle, perform first uplink transmission after a first time interval when a start moment of an integer quantity of OFDM symbols of an uplink subframe specified by a network device, for example, the base station, arrives. The first time interval is a time interval between an end moment of the channel sensing and the start moment of the integer quantity of OFDM symbols of the uplink subframe specified by the base station, or the first time interval is a time interval between the end moment of the channel sensing and an end of duration of an idle OFDM symbol.

The first time interval includes some OFDM symbols, at least one complete OFDM symbol, a combination thereof, or the like. This is not limited in this embodiment of this application.

In addition, if the sensed channel is busy, the UE 1 does not perform the first uplink transmission.

In a process of communicating with the base station, the UE 1 has already known in advance or both parties have agreed on the integer quantity of OFDM symbols of the uplink subframe specified by the base station, for example, the 1$^{st}$ OFDM symbol of a first uplink transmission part. Therefore, the UE 1 starts to perform, after sensing the channel, the first uplink transmission after a time interval and when a start moment of the 1$^{st}$ OFDM symbol of the first uplink transmission part arrives.

After the UE 1 senses the channel and before the UE 1 sends uplink data, the method further includes detecting, by the UE 1, whether the base station performs second downlink transmission in an unlicensed frequency band after the first guard period from an end moment of the first downlink transmission, that is, detecting whether a second downlink signal is received, and if the second downlink signal is detected, sending, by the UE 1, the uplink data when a start moment of the integer quantity of OFDM symbols of the first uplink transmission part of the base station arrives. If it is detected that the second downlink signal is not received, it indicates that the base station may be strongly interfered with, and does not send the second downlink signal. In this case, even if the UE 1 sends the uplink data, a probability of correct reception performed by the base station is reduced due to the interference. Therefore, the UE 1 does not send the uplink data, thereby reducing power consumption of the UE 1.

According to the method provided in this embodiment, after sensing the channel, the UE sends the uplink data after the first time interval and when the start moment of the integer quantity of OFDM symbols of the uplink subframe specified by the base station arrives. The UE does not need to send an uplink signal to preempt a channel, and instead, the base station performs downlink transmission after the first guard period from the end moment of the first downlink transmission. Therefore, the UE does not need to send some OFDM symbols that cannot carry useful information, thereby reducing power consumption of the UE. In addition, excessive protection caused by sending the some OFDM symbols by the UE is further avoided. This method reduces a possibility of excessive protection and improves an overall throughput rate of a system.

Corresponding to the foregoing method embodiments, the embodiments of this application further provide corresponding embodiments of apparatuses such as a terminal device and a network device.

Figure 12:
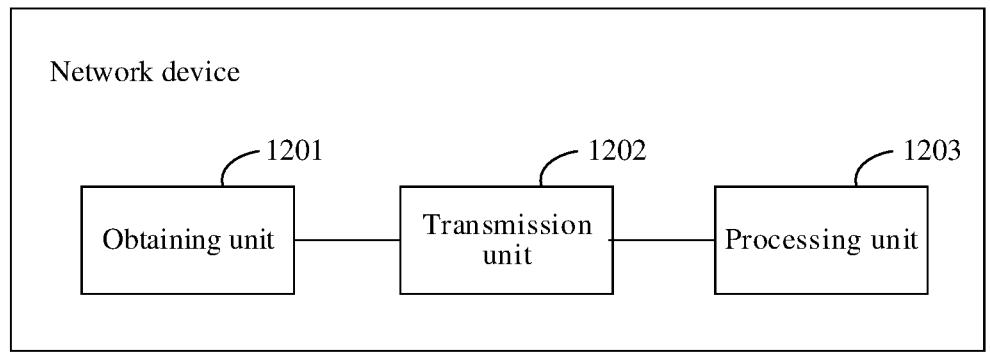
FIG. 12 is a schematic diagram of a network device according to an embodiment of this application.

FIG. 12 is a schematic structural diagram of a network device according to an embodiment of this application. The network device is configured to perform the signal transmission method shown in FIG. 5. The network device may include an obtaining unit 1201 and a transmission unit 1202.

The obtaining unit 1201 is configured to obtain an end moment of first downlink transmission, where the first downlink transmission occupies one or more downlink subframes, a downlink transmission part of a self-contained subframe, or a combination of one or more downlink subframes and a downlink transmission part of a self-contained subframe.

The transmission unit 1202 is configured to perform second downlink transmission in an unlicensed frequency band after a first guard period from the end moment of the first downlink transmission, where at least one terminal device senses a channel in the first guard period, and the second downlink transmission is used to reserve the channel for the at least one terminal device.

In this embodiment of this application, the network device performs the second downlink transmission in the unlicensed frequency band after the first guard period from the end moment of the first downlink transmission, for example, sends a second downlink signal to reserve the channel for the at least one terminal device. Therefore, the terminal device does not need to send an uplink signal again, thereby saving transmit power of the terminal device.

In a specific implementation of this embodiment, the terminal device further includes a processing unit 1203, configured to determine duration of the first guard period based on channel sensing duration allocated to each terminal device.

In addition, the processing unit 1203 is further configured to determine a second guard period based on at least one of a TA of each terminal device or a capability, of each terminal device, of switching from downlink transmission to uplink transmission, and determine duration of the second downlink transmission based on the first guard period and the second guard period.

The duration of the second downlink transmission is a time interval between an end moment of the first guard period and a start moment of the second guard period. Alternatively, the duration of the second downlink transmission is a time interval between an end moment of the first guard period and a start moment of an integer quantity of OFDM symbols of an uplink subframe specified by the network device.

In another specific implementation of this embodiment, if the time interval between the end moment of the first downlink transmission and the start moment of the integer quantity of OFDM symbols of the uplink subframe specified by the network device is duration of an idle OFDM symbol, and the duration of idle OFDM symbol corresponds to a first subcarrier, the processing unit 1203 is further configured to implement the following functions.

The processing unit 1203 is further configured to set a second subcarrier, where the second subcarrier is N times the first subcarrier, N is an integer greater than or equal to 2, the second subcarrier corresponds to duration of a second OFDM symbol, and the duration of the second downlink transmission includes at least one second OFDM symbol.

The transmission unit 1202 is specifically configured to perform the second downlink transmission by using the at least one second OFDM symbol, where each second OFDM symbol carries any one or a combination of control signaling, a reference signal, or a synchronization signal.

For example, duration of the idle OFDM symbol is approximately 71.35 μs, a corresponding first subcarrier spacing is 15 kHz, and the base station configures a second subcarrier of 60 kHz, where duration of an OFDM symbol corresponding to the second subcarrier is approximately 17.84 μs, and is ¼ that of the idle OFDM symbol. Therefore, the duration of the second downlink transmission includes at least one OFDM symbol corresponding to the second subcarrier, and the network device may add useful information such as add control signaling, a reference signal, and a synchronization signal to the integer quantity of OFDM symbols, and transmit the useful information to the terminal device.

In another specific implementation of this embodiment of this application, the transmission unit 1202 is further specifically configured to sense a channel in the first guard period, to detect whether the channel is idle, and if the sensed channel is idle, perform the second downlink transmission in the unlicensed frequency band after the first guard period from the end moment of the first downlink transmission, or if the sensed channel is busy, skip performing the second downlink transmission.

Figure 13:
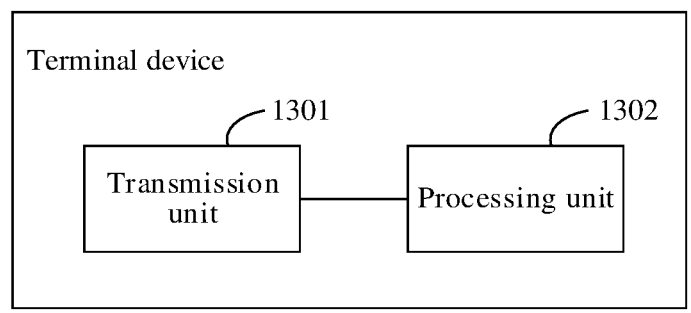
FIG. 13 is a schematic diagram of a terminal device according to an embodiment of this application.

FIG. 13 is a schematic diagram of a terminal device according to an embodiment of this application. The terminal device is configured to perform the signal transmission method shown in FIG. 11. The terminal device may include a transmission unit 1301 and a processing unit 1302.

The transmission unit 1301 is configured to sense a channel in a first guard period, and if the sensed channel is idle, perform first uplink transmission after a first time interval and when a start moment of an integer quantity of OFDM symbols of an uplink subframe specified by a network device arrives, where the first time interval is a time interval between an end moment of the channel sensing and the start moment of the integer quantity of OFDM symbols of the uplink subframe specified by the network device.

Further, in a specific implementation of this embodiment of this application, the terminal device further includes the processing unit 1302, configured to detect whether the network device performs second downlink transmission.

The transmission unit 1301 is specifically configured to if the network device performs the second downlink transmission, send uplink data to the network device when the start moment of the integer quantity of OFDM symbols of the specified uplink subframe arrives.

According to the network device and the terminal device provided in the embodiments, the terminal device sends, after sensing the channel, the uplink data after the first time interval and when the start moment of the integer quantity of OFDM symbols of the uplink subframe specified by the network device arrives. The terminal device does not need to send an uplink signal to preempt a channel, and instead, the network device performs downlink transmission after the first guard period from the end moment of the first downlink transmission. Therefore, the terminal device does not need to send some OFDM symbols that cannot carry useful information, thereby reducing power consumption of the terminal device. In addition, excessive protection caused by sending the some OFDM symbols by the terminal device is further avoided. Therefore, a possibility of excessive protection is reduced, and an overall throughput rate of a system is improved.

Figure 14:
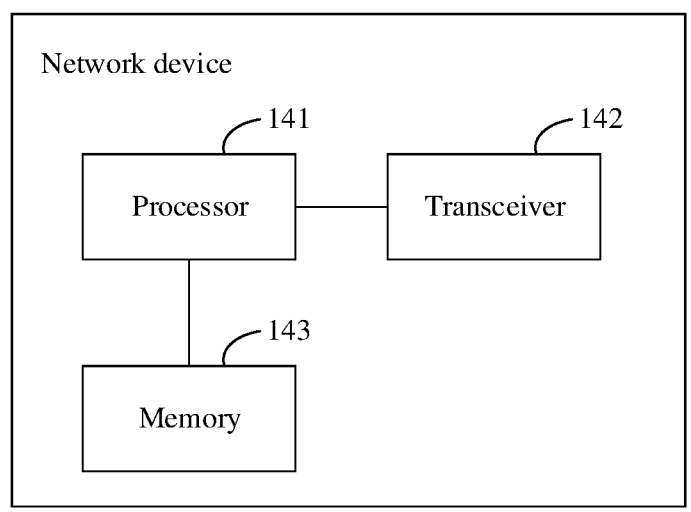
FIG. 14 is a schematic structural diagram of a network device according to an embodiment of this application.

FIG. 14 is a schematic diagram of a network device according to an embodiment of this application. The network device may be the network device in any one of the foregoing embodiments, and is configured to implement the method steps in the foregoing embodiments.

The network device may include a processor 141, a transceiver 142, a memory 143, and the like.

The processor 141 is a control center of the network device, is connected to various parts of the entire network device through various interfaces and lines, and performs various functions of the network device and/or processes data by running or executing a software program and/or module stored in the memory and invoking data stored in the memory 143. The processor 141 may be a central processing unit (CPU), a network processor (NP), or a combination of a CPU and an NP. The processor may further include a hardware chip. The hardware chip may be an application-specific integrated circuit (ASIC), a programmable logic device (PLD), or a combination thereof. The PLD may be a complex programmable logic device (CPLD), a field-programmable gate array (FPGA), a generic array logic (GAL for short), or any combination thereof.

The memory 143 may include a volatile memory (volatile memory), for example, a random access memory (RAM), or may include a non-volatile memory (non-volatile memory), for example, a flash memory (flash memory), a hard disk drive (HDD), or a solid-state drive (SSD). Alternatively, the memory 143 may include a combination of the foregoing types of memories. The memory may store a program or code. The processor 141 of the network device may implement the functions of the network device by executing the program or the code.

The transceiver 142 may be configured to send or receive a signal, and perform uplink and downlink transmission with a terminal device. The transceiver 142 may send, under control of the processor 141, a signal to the terminal device or another network device, and the transceiver 142 receives, under control of the processor 141, data sent by the terminal device or another network device.

In this embodiment of this application, the transceiver 142 may be configured to implement the method steps of the signal transmission method in the embodiment shown in FIG. 5. The functions that need to be implemented by the obtaining unit 1201 and the transmission unit 1202 in FIG. 12 may be implemented by the transceiver 142 of the network device, or may be implemented by the transceiver 142 controlled by the processor 141. The functions that need to be implemented by the processing unit 1203 may be implemented by the processor 141.

Figure 15:
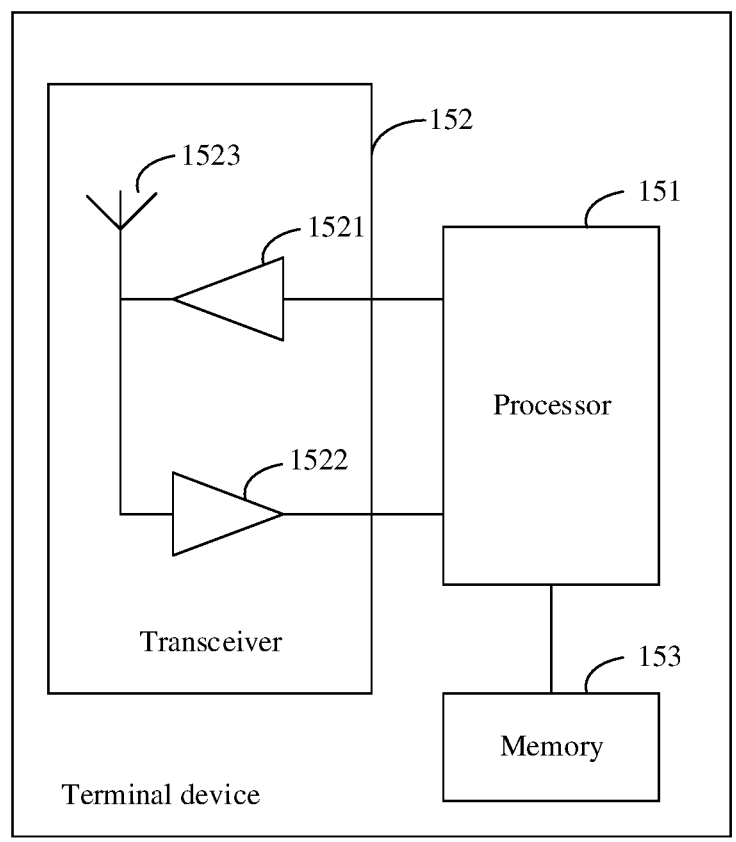
FIG. 15 is a schematic structural diagram of a terminal device according to an embodiment of this application.

FIG. 15 is a schematic structural diagram of a terminal device according to an embodiment of this application. The terminal device may be a terminal device in any one of the foregoing embodiments, and is configured to implement method steps in the foregoing embodiments.

As shown in FIG. 15, the terminal device may include a processor 151, a transceiver 152, and a memory 153. The transceiver 152 may include components such as a receiver 1521, a transmitter 1522, and an antenna 1523. The terminal device may alternatively include more or fewer components, or combine some components, or have different component arrangements. This is not limited in this application.

The processor 151 is a control center of the terminal device, connected to various parts of the entire terminal device through various interfaces and lines, and performs various functions of the terminal device and/or processes data by running or executing a software program and/or module stored in the memory 153 and invoking data stored in the memory 153. The processor 151 may include an integrated circuit (IC), for example, may include a single packaged IC, or may include a plurality of connected packaged ICs with a same function or different functions. For example, the processor 151 may include only a central processing unit (CPU), or may be a combination of a GPU, a digital signal processor (DSP), and a control chip (for example, a baseband chip) in a transceiver module. In various implementations of this application, the CPU may include a single computing core, or may include a plurality of computing cores.

The transceiver 152 is configured to establish a communications channel, so that the terminal device is connected to a network device through the communications channel, to implement communication transmission between the terminal device and the network device. The transceiver module 152 may include communications modules such as a wireless local area network (WLAN) module, a Bluetooth module, and a baseband module, and radio frequency (RF) circuits corresponding to the communications modules, to perform wireless local area network communication, Bluetooth communication, infrared communication, and/or communication in a cellular communications system, for example, wideband code division multiple access (WCDMA) and/or high speed downlink packet access (high speed downlink packet access, HSDPA). The transceiver is configured to control communication between the components of the terminal device, and may support direct memory access (direct memory access).

In different implementations of this application, various transceiver modules in the transceiver module 152 are usually presented in a form of an integrated circuit chip, and may be selectively combined without a need to include all the transceiver modules and corresponding antenna groups. For example, the transceiver 152 may include only a baseband chip, a radio frequency chip, and a corresponding antenna, to provide a communication function in a cellular communications system. The terminal device may be connected to a cellular network or the Internet by using a wireless communication connection established by the transceiver, for example, through wireless local area network access or WCDMA access. In some optional implementations of this application, the communication modules, for example, the baseband module, in the transceiver may be integrated into the processor. A typical example is an APQ+ MDM series platform provided by Qualcomm. The radio frequency circuit is configured to send and receive information, or send and receive a signal in a call process. For example, the radio frequency circuit receives a downlink signal of the network device and sends the downlink signal to the processor for processing. In addition, the radio frequency circuit sends uplink data to the network device. Usually, the radio frequency circuit includes a known circuit used to perform these functions, and includes but is not limited to an antenna system, a radio frequency transceiver, one or more amplifiers, a tuner, one or more oscillators, a digital signal processor, a codec chipset, a subscriber identity module (SIM) card, a memory, and the like. In addition, the radio frequency circuit may further communicate with a network and another device through wireless communication. Any communication standard or protocol may be used for the wireless communication, including but not limited to a global system for mobile communications (GSM), a general packet radio service (GPRS), code division multiple access (CDMA), wideband code division multiple access (WCDMA), a high speed uplink packet access (HSUPA) technology, long term evolution (LTE), an email, a short message service (SMS), and the like.

In this embodiment of this application, the transceiver 152 may be configured to implement the method steps of the signal transmission method in the embodiment shown in FIG. 11. The function that needs to be implemented by the transmission unit 1301 in FIG. 13 may be implemented by the transceiver 152 of the terminal device, or may be implemented by the transceiver 152 controlled by the processor 151. The function that needs to be implemented by the processing unit 1302 may be implemented by the processor 151.

During specific implementation, an embodiment of this application further provides a computer storage medium. The computer storage medium may store a program, where when the program is executed, some or all of the steps included in the embodiments of the signal transmission method provided in this application may be performed. The storage medium may be a magnetic disk, an optical disc, a read-only memory (ROM), a random access memory (RAM), or the like.

In addition, an embodiment of this application further provides a computer program product including an instruction. When the computer program product is run on a computer, the computer is enabled to perform the steps of the signal transmission method in the foregoing embodiments.

A person skilled in the art may clearly understand that the technologies in the embodiments of the present disclosure may be implemented by software in addition to a necessary general hardware platform. Based on such an understanding, the technical solutions of the embodiments of the present disclosure essentially or the part contributing to the prior art may be implemented in a form of a software product. The computer software product may be stored in a storage medium, such as a ROM/RAM, a magnetic disk, or an optical disc, and includes several instructions for enabling a computer device (which may be a personal computer, a server, a network device, or the like) to perform the methods in the embodiments or some parts of the embodiments of the present disclosure.

The embodiments in this specification are all described in a progressive manner, for same or similar parts in the embodiments, refer to these embodiments, and each embodiment focuses on a difference from other embodiments. Especially, system and apparatus embodiments are basically similar to a method embodiment, and therefore are described briefly. For related parts, refer to partial descriptions in the method embodiments.

The foregoing implementations of the present disclosure are not intended to limit the protection scope of the present disclosure. Any modification, equivalent replacement, and improvement made without departing from the principle of the present disclosure shall fall within the protection scope of the present disclosure.

What is claimed is:

1. A signal transmission method comprising:
obtaining, by a network device, an end moment of a first downlink transmission, wherein the end moment of the first downlink transmission is a time at which the first downlink transmission ends, wherein the first downlink transmission occupies at least one of one or more downlink subframes, a downlink transmission part of a self-contained subframe, or a combination of one or more downlink subframes and a downlink transmission part of a self-contained subframe;
determining, by the network device, a second guard period according to at least one of a timing advance (TA) of each terminal device of a plurality of terminal devices in signal communication with the network device or a capability, of each terminal device, of switching from downlink transmission to uplink transmission; and
performing, by the network device, after determining the second guard period, second downlink transmission immediately after a first guard period that starts immediately after the end moment of the first downlink transmission, wherein the second downlink transmission is in an unlicensed frequency band and is immediately before the second guard period, wherein at least one terminal device senses a channel in the first guard period, wherein the channel for the at least one terminal device is reserved by the second downlink transmission, wherein a duration of the second downlink transmission is determined according to the first guard period and the second guard period, and wherein the second downlink transmission divides an idle orthogonal frequency division multiplexing (OFDM) symbol into the first guard period and the second guard period.

2. The method according to claim 1, wherein the method further comprises performing, before the performing, by the network device, the second downlink transmission:
determining, by the network device, a duration of the first guard period according to a channel sensing duration allocated to each terminal device.

3. The method according to claim 2, wherein the method further comprises performing, before the performing, by the network device, the second downlink transmission:
determining, by the network device, the duration of the second downlink transmission according to the first guard period and the second guard period.

4. The method according to claim 3, wherein the duration of the second downlink transmission is a time interval between an end moment of the first guard period and a start moment of the second guard period, wherein the end moment of the first guard period is a time at which the first guard period ends, and wherein the start moment of the second guard period is a time at which the second guard period starts.

5. The method according to claim 3, wherein the duration of the second downlink transmission is a time interval between an end moment of the first guard period and a start moment of an integer quantity of OFDM symbols of an uplink subframe specified by the network device, wherein the end moment of the first guard period is a time at which the first guard period ends, and wherein the start moment of the integer quantity of the OFDM symbols is a time at which the integer quantity of the OFDM symbols starts.

6. The method according to claim 5, wherein the time interval between the end moment of the first downlink transmission and the start moment of the integer quantity of OFDM symbols of the uplink subframe specified by the network device is a duration of the idle OFDM symbol, and wherein the duration of the idle OFDM symbol corresponds to a first subcarrier; and
wherein the performing, by the network device, the second downlink transmission comprises:
setting, by the network device, a second subcarrier, wherein the second subcarrier is N times the first subcarrier, wherein N is an integer greater than or equal to 2, wherein the second subcarrier corresponds to duration of a second OFDM symbol, and wherein the duration of the second downlink transmission comprises at least one second OFDM symbol; and
performing, by the network device, the second downlink transmission using the at least one second OFDM symbol, wherein each second OFDM symbol carries at least one of control signaling, a reference signal, or a synchronization signal.

7. The method according to claim 1, wherein the performing, by the network device, the second downlink transmission comprises:
sensing, by the network device, a channel in the first guard period; and
performing at least one of:
performing, by the network device, in response to if the sensed channel being idle, the second downlink transmission in the unlicensed frequency band after the first guard period from the end moment of the first downlink transmission; or
skipping performing the second downlink transmission in response to the sensed channel being busy.

8. The method of claim 1, wherein the second downlink transmission includes at least one of a downlink subframe, a downlink slot, or a downlink mini-slot.

9. A network device, comprising:
a transmission unit;
a processor; and
a non-transitory computer readable medium storing a program for execution by the processor, the program including instructions to:
obtain an end moment of a first downlink transmission, wherein the end moment of the first downlink transmission is a time at which the first downlink transmission ends, wherein the first downlink transmission occupies at least one of one or more downlink subframes, a downlink transmission part of a self-contained subframe, or a combination of one or more downlink subframes and a downlink transmission part of a self-contained subframe;
determine a second guard period according to at least one of a timing advance (TA) of each terminal device of a plurality of terminal devices in signal communication with the network device or a capability, of each terminal device, of switching from downlink transmission to uplink transmission; and
cause the transmission unit to perform, after determining the second guard period, second downlink transmission immediately after a first guard period that starts immediately after the end moment of the first downlink transmission, wherein the second downlink transmission is in an unlicensed frequency band and is immediately before the second guard period, wherein at least one terminal device senses a channel in the first guard period, wherein the channel for the at least one terminal device is reserved by the second downlink transmission, wherein a duration of the second downlink transmission is determined according to the first guard period and the second guard period, and wherein the second downlink transmission divides an idle orthogonal frequency division multiplexing (OFDM) symbol into the first guard period and the second guard period.

10. The network device according to claim 9, wherein the program further includes instructions to:
determine a duration of the first guard period according to a channel sensing duration allocated to each terminal device.

11. The network device according to claim 10, wherein the program further includes instructions to:
determine the duration of the second downlink transmission according to the first guard period and the second guard period.

12. The network device according to claim 11, wherein the duration of the second downlink transmission is a time interval between an end moment of the first guard period and a start moment of the second guard period, wherein the end moment of the first guard period is a time at which the first guard period ends, and wherein the start moment of the second guard period is a time at which the second guard period starts.

13. The network device according to claim 11, wherein the duration of the second downlink transmission is a time interval between an end moment of the first guard period and a start moment of an integer quantity OFDM symbols of an uplink subframe specified by the network device, wherein the end moment of the first guard period is a time at which the first guard period ends, and wherein the start moment of the integer quantity of the OFDM symbols is a time at which the integer quantity of the OFDM symbols start.

14. The network device according to claim 13, wherein the time interval between the end moment of the first downlink transmission and the start moment of the integer quantity of OFDM symbols of the uplink subframe specified by the network device is a duration of an idle OFDM symbol, and wherein the idle OFDM symbol corresponds to a first subcarrier;
wherein the program further includes instructions to set a second subcarrier, wherein the second subcarrier is N times the first subcarrier, wherein N is an integer greater than or equal to 2, wherein the second subcarrier corresponds to a duration of a second OFDM symbol, and wherein the duration of the second downlink transmission comprises at least one second OFDM symbol; and
wherein the instructions to cause the transmission unit to perform the second downlink transmission include instructions to cause the transmission unit to perform the second downlink transmission using the at least one second OFDM symbol, wherein each second OFDM symbol carries at least one of control signaling, a reference signal, or a synchronization signal.

15. The network device according to claim 9, wherein program further includes instructions to cause the transmission unit to:
sense a channel in the first guard period; and
perform at least one of
perform the second downlink transmission in the unlicensed frequency band in response to the sensed channel being idle, and after the first guard period from the end moment of the first downlink transmission; or
skip performing the second downlink transmission in response to the sensed channel being busy.

16. The network device of claim 9, wherein the second downlink transmission includes at least one of a downlink subframe, a downlink slot, or a downlink mini-slot.

17. A terminal device, wherein the terminal device comprises:
a transmission unit;
a processor; and
a non-transitory computer readable medium storing a program for execution by the processor, the program including instructions to:
cause the transmission unit to sense a channel in a first guard period, wherein the first guard period is immediately after a first downlink transmission performed by a network device, and wherein an end moment of the first guard period is a time at which the first guard period ends;
detect, in a second downlink transmission period, whether the network device performs second downlink transmission, wherein the second downlink transmission period is immediately after the first guard period ends, and wherein the second downlink transmission divides an idle orthogonal frequency division multiplexing (OFDM) symbol into the first guard period and a second guard period; and
cause the transmission unit to, in response to the sensed channel being idle, and further in response to detecting that the network device performs the second downlink transmission, perform first uplink transmission after a first time interval and when a start moment of an integer quantity of OFDM symbols of an uplink subframe specified by a network device arrives, wherein the first time interval is a time interval between an end moment of the first guard period and the start moment of the integer quantity of OFDM symbols of the uplink subframe specified by the network device, wherein the first time interval comprises the second downlink transmission period and at least a portion of the second guard period, wherein the second downlink transmission is in an unlicensed frequency band and is immediately before the second guard period, wherein the first interval has a duration that is an integer multiple of a duration of an OFDM symbol, wherein the second guard period has a duration selected according to at least one of a timing advance (TA) of each terminal device of a plurality of terminal devices in signal communication with the network device or a capability, of each terminal device, of switching from downlink transmission to uplink transmission and wherein the start moment of the integer quantity of the OFDM symbols is a time at which the integer quantity of the OFDM symbols start; and
cause the transmission unit to, in response to at least one of the sensed channel being busy or detecting that the network device does not perform the second downlink transmission, skip performing the first uplink transmission.

18. The terminal device of claim 17, wherein the first uplink transmission is a physical uplink shared channel (PUSCH) transmission.

* * * * *

UNITED STATES PATENT AND TRADEMARK OFFICE
CERTIFICATE OF CORRECTION

PATENT NO. : 11,330,442 B2
APPLICATION NO. : 16/679877
DATED : May 10, 2022
INVENTOR(S) : Jun Zhu et al.

It is certified that error appears in the above-identified patent and that said Letters Patent is hereby corrected as shown below:

In the Claims

Claim 13, Column 21, Line 33; insert --of-- between "quantity" and "OFDM".

Signed and Sealed this
Fourteenth Day of June, 2022

Katherine Kelly Vidal
*Director of the United States Patent and Trademark Office*